Sept. 24, 1940.  W. C. MILES  2,215,971
FISH LURE
Filed July 9, 1937
Fig.1.
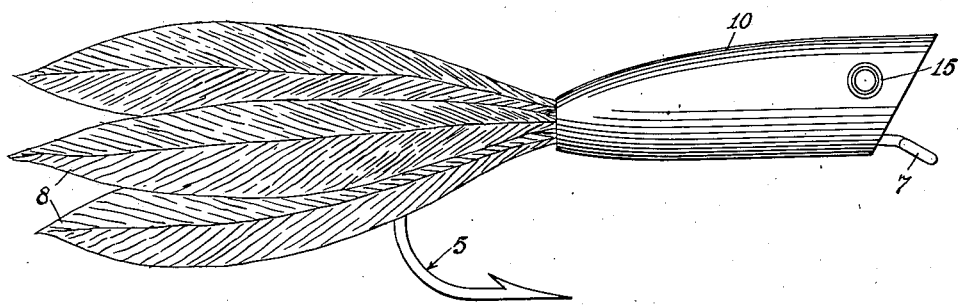
Fig.2.
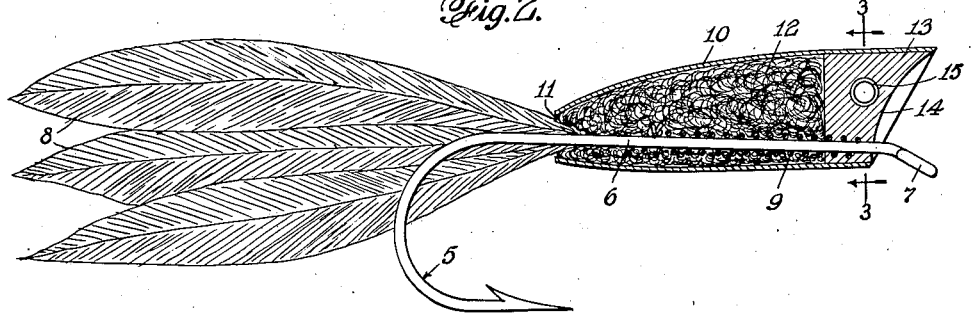
Fig.3.
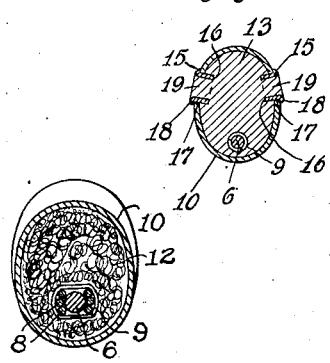
Fig.4.
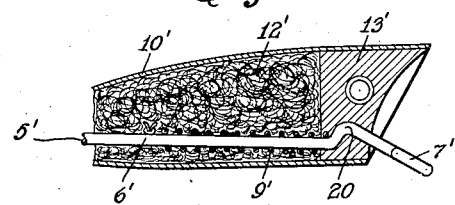
Fig.5.
INVENTOR.
William C. Miles Patented Sept. 24, 1940

2,215,971

UNITED STATES PATENT OFFICE 2,215,971

FISH LURE

William C. Miles, White Plains, N. Y.

Application July 9, 1937, Serial No. 152,685

18 Claims. (Cl. 43—48)

This invention relates to fish lures, and has particular reference to that class of fly-rod lures which are characterized by the fact that their bodies are made, at least in part, of a material which of itself will float in order to lend to the lure the desired floating quality or the desired tendency to float.

Many materials have been used heretofore in making the bodies of lures of the above class, but the difficulty with such materials resides in the fact that if a sufficient quantity of any of them is employed to lend to a given lure the desired floating quality or the desired tendency to float, then the body of that lure becomes unduly large, with the result that it will offer a pronounced and objectionable wind resistance during the cast and an equally pronounced and objectionable water resistance incident to the pickup; whereas, if the size of the lure body is decreased in order to obviate objectionable resistances of the character mentioned then the desired floating quality of the lure or the desired floating tendency thereof cannot be attained.

An important object of the present invention is to overcome the above-mentioned objections and to that end I contemplate the use of a body-forming material which is of a fibrous character, which is highly repellent to water when maintained in a relatively compact condition, and which even when held in a relatively compact condition is extremely buoyant—an example of such material being known commercially as kapok.

Other objects and advantages of the invention will become apparent from the following description when taken in connection with the accompanying drawing, in which—

Fig. 1 is an enlarged view showing in elevation one form of fly-rod lure embodying the present invention; Fig. 2 is a central, longitudinal, vertical, sectional view of the lure appearing in Fig. 1; Fig. 3 is a transverse, sectional view taken on line 3—3 of Fig. 2; Fig. 4 is a fragmental, central, longitudinal, vertical, sectional view showing a slightly modified form of lure embodying the present invention; and Fig. 5 is an enlarged transverse sectional view of the lure showing the bared or stripped shafts of the tail-forming feathers bound to the shank of the hook.

Referring to Figs. 1 to 3 of the drawing, wherein is illustrated on a scale of 2½ to 1 a bass lure of the so-called feather minnow type, the numeral 5 indicates a fish hook, the shank portion 6 of which is formed at its forward end with a turned-down eye 7. In actual practice, I have employed to advantage in the lure illustrated a No. 1 "Model Perfect" hook, manufactured by S. Allcock & Co., Ltd. and identified in the trade under stock No. 4991.

To the shank portion 6 of the hook there are suitably connected a plurality of tail-forming elements which are herein illustrated as feathers 8. I have found rooster feathers, obtained from the neck and the saddle, admirably adapted for use as the tail-forming elements of the present lure, although feathers of various origins as well as other tail-forming elements may be employed.

In preparing the feathers for use, each feather is stripped of its barbs for about ⅜" beginning at a point about 2" to 2½" from its tip. Preparatory to attaching the feathers to the shank of the hook, a suitable number of such feathers, together with the hook, are placed in a suitable assembling device, not shown, and are clamped in such positions that the stripped shafts lie adjacent to and extend lengthwise of the shank of the hook at opposite sides thereof. After clamping the feathers and the hook in the assembling device, the surplus quill ends of the feathers are severed, after which a suitable binding 9, such as a thread of silk, is wound about the bared or stripped shafts so as to anchor them to the shank of the hook. Preferably, the winding operation is begun at or in the vicinity of the juncture of the barbs with the respective bared shafts and is continued past the ends of the bared shafts to the vicinity of the juncture of the shank 6 and eye 7 of the hook, from which latter point the wrapping is continued rearwardly of the hook to the starting point where the free or loose ends of the thread are tied or otherwise fastened together. After attaching the feathers to the hook 5, the shank 6 of the hook is introduced into a body shell 10 through the rear opening 11 thereof and is moved forwardly, with reference to the shell, a sufficient distance to allow the eye 7 of the hook to assume a position slightly in front of the forward end of the body shell. After thus introducing the shank of the hook into the body shell 10, such shell is packed with kapok 12 so as to form a relatively compact filler of that material extending from the rear of the shell to a point lying in a plane passing transversely through the shell at a substantial distance rearwardly from the front end thereof. As shown in Fig. 2, the shank of the hook is maintained well below the longitudinal axis of the body shell 10 so as to serve as a keel for the lure, and is surrounded by the kapok 12 except for a relatively short portion of its length adjacent the eye 7.

In order to seal the front end of the body shell 10, a cement, commerically known as "Ambroid," is forcibly introduced into the shell by way of the front end thereof so as to form a plug-like closure 13 which surrounds the shank 6 of the hook 5 for a substantial portion of its length. The cement known as "Ambroid" is especially adapted for use to advantage in the present instance, because it, when drying, shrinks about and firmly anchors itself to the shank of the hook, such anchorage being particularly pronounced in the presence of that portion of the binding 9 which is exposed to the cement adjacent the eye 7 of the hook. The particular cement just mentioned is further adapted for use in the present instance, because it, when drying, so shrinks that the plug-like closure 13 presents a concave surface, as shown at 14, with the result that the forward end of the finished lure is thus provided with a cup-like depression by which the lure, when manipulated in a well-known manner on the surface of the water, may be induced to set up a so-called "pop," which is a relatively sharp detonation that is accompanied by a noticeable disturbance of the water at its surface.

Inasmuch as the body shell 10 is substantially elliptical, as shown in Fig. 3, and since the plug-like closure 13 snugly fits within the shell and is firmly anchored to the shank 6 of the hook 5, it follows that the hook in its entirety is held against turning with respect to the body shell. Turning of the hook with reference to the body shell is further prevented by reason of the fact that the plug-like closure 13, which is firmly anchored to the shank of the hook, is in adhering union with the inner wall of the shell. Moreover, it will be observed that inasmuch as the plug-like closure 13 is anchored to the shank of the hook and is in adhering union with the inner wall of the shell, the hook is also insured against longitudinal displacement with reference to the shell. In order to further guard against displacement of the plug-like closure 13 with respect to the shell 10, and thus further insure against displacement of the hook with reference to such shell, a pair of tubular rivets 15 are utilized to augment the anchorage that is afforded by reason of the adhering union of the closure with the shell. In this connection it will be noted that the shanks 16 of the tubular rivets are of such lengths that they, when inserted in openings 17, drilled or otherwise formed in the body shell 10 to snugly receive them, project an appreciable distance into the body shell so that the cement, which is introduced into the shell pursuant to assembling the rivets with reference to such shell, will surround the shanks of the rivets and thus, upon drying, permanently anchor them with relation to the closure 13. Further regarding the rivets 15, it will be observed that the inner ends of their shanks 16 are spaced an appreciable distance from each other so as to permit the cement, as it is forcibly introduced into the body shell 10, to unobstructedly enter the rivet shanks where it, when dry, will form a pair of cores 19 which are integral with the closure 13 and in adhering union with the inner wall of the shanks of the rivets. When forcibly introducing the cement, its escape by way of the tubular rivet is prevented by reason of the fact that the lure is held during the cement-introducing operation in one's hand with the ball of his thumb overlying one rivet and the ball of his forefinger overlying the other rivet. By thus holding the lure during the cement-introducing operation, undue displacement of the rivets is prevented and at the same time the outward flow of cement therein is so limited that the outer surfaces of the core-forming portions of the cement lie slightly within the rivets, that is to say, slightly below the rim of their head ends. As the core-forming cement dries, the outer surface thereof slightly recedes in the manner described in connection with the plug-like closure 13, with the result that each of the cores 19 presents at its outer end a cup-like depression admirably adapted for the reception of a small quantity of lacquer suitably colored to represent, when considered in conjunction with the outlying or surrounding rivet heads or flanges 18, the eye of a minnow or such other natural bait as the lure may be designed to simulate. It is to be especially observed that when the eye-forming lacquer is characterized by the fact that its acetate solvent is chemically the same or substantially the same as that which characterizes the cement ("Ambroid"), such lacquer will adhere with great tenacity to the cores 19, with the result that undue peeling or chipping is obviated even though the lure may be subjected to severe conditions in actual use. Moreover, the eye-forming lacquer is further protected in actual use by reason of the fact that it is confined within the cup-like depression hereinbefore described as peculiar to the cores 19 and lies slightly within the rivets, that is to say, slightly below the rim of their head ends.

As to the body shells 10, I have discovered that quills of certain feathers may be employed to advantage in their making. In the particular lure herein illustrated, I have elected to use the quills of turkey wing feathers because they possess a substantial degree of transparency, are light in weight, are extremely tough, are sufficiently yieldable to avoid undue cracking, are so shaped that they present a substantially elliptical contour when considered in transverse section, and are so shaped, as shown in Fig. 1, that they present in elevation a substantially straight line at the bottom and a gracefully curved line at the top.

In forming the body shell 10, the tip end of the quill, which in a normal feather is closed or substantially closed, is severed so as to insure a proper diameter for the rear opening 11, and the quill is then severed at a suitable angle with respect to its longitudinal axis so as to provide at the front end of the body shell an upwardly and forwardly inclined bevel. After thus severing the body shell from the quill, any pith contained within the shell is removed, as by a suitable rotating brush, whereupon the rivet-receiving openings 17 are drilled or otherwise formed.

Taking into account that the quill from which the body shell is formed possesses a substantial degree of transparency, it is possible to lend one of any number of colors to such shell, pursuant to the pith-removing operation, by coating the inner wall of the shell with a suitable paint. In this connection I have employed to advantage a quick-drying lacquer which I have been able to uniformly apply, through the aid of suitable apparatus not shown, over a predetermined length of the shell extending from the extreme rear end thereof to the line of juncture between the filler of kapok 12 and the plug-like closure 13. Furthermore, I have been able to lend to the head portion of the body shell, namely, that portion which is coextensive with the plug-like closure 13, one of any number of colors by accordingly coloring the closure-forming cement ("Ambroid")

by mixing with it a small quantity of aniline dye dissolved either in alcohol or amyl acetate, but preferably the latter. Thus it will be appreciated that since the color-lending materials, namely, the lacquer (with which the inner wall of the body shell is coated throughout the major portion of its length) and the cement (which upon hardening forms the closure 13) are carried within and protected by the body shell, there can be no eradication of color such as might well occur were a coloring medium, such as lacquer, applied to the outer surface of the body shell.

Regarding the elliptical contour which a turkey feather presents in transverse section, it may be well to here mention the fact that this peculiarity is important not only because it simulates the general body contour of a minnow but also because it enables the shank of the hook to be placed at a substantial distance below the longitudinal axis of the lure body so as to enable it to effectively serve as a keel by which an upright position of the lure in or on the water is insured.

In view of the foregoing discussion of the advantages to be derived from the factor of transparency which is peculiar to turkey feather quills and the advantages to be derived from the fact that such quills are oval shape in transverse section, it is believed that no further discussion of the remaining enumerated characteristics of turkey quills is necessary; but it may be well to point out that such quills are additionally characterized by the fact that they possess more or less oil which lends to them a somewhat greasy outer surface and to state that the buoyancy of the lure may be augmented by the presence of the greasy surface. I have found, however, that such greasiness, if not desired (as when the lure is designed to sink by providing it with a smaller body with reference to the weight of such relatively non-buoyant elements as the hook) may be lessened by soaking the body shells in amyl acetate.

While I have found that straight-shank hooks may be satisfactorily anchored against turning or other displacement with respect to the plug-like closure of the lure above described, it may be well to mention that if desired the type of hook shown in Fig. 4 and there indicated by the numeral 5' may be employed to advantage in that its shank 6' is provided with a hump 20, which, when embedded in the plug-like closure 13', affords an effective anchor because of its off-set relation to the axis of the hook shank. When a hook such as that shown in Fig. 4 is employed, I prefer to terminate the binding 9' well short of the eye 7' of the hook, in which case the binding will be wholly or substantially wholly within the filler of kapok 12' with which the body shell 10' is packed.

Although only one modification is herein shown and described, it will be understood that various changes may be made without departing from the spirit of the invention or the scope of the following claims.

What is claimed is:

1. In a fish lure, a hook having a shank, a shell surrounding said shank and having in transverse section an oblong contour, a plug-like closure confined within said shell, said closure being in union with said shank and conforming to said oblong contour whereby said hook is reinforced against rotation with respect to said shell, and anchoring means for lending further reinforcement against rotation of said hook with respect to said shell and for anchoring said hook against longitudinal displacement with respect to said shell, said anchoring means including one or more lug-like elements extending through the wall of said shell and into said plug-like closure.

2. In a fish lure, a hook having a shank, a shell surrounding said shank and having in transverse section an oblong contour, a plug-like closure confined within said shell, said closure being in union with said shank and conforming to said oblong contour whereby said hook is reinforced against rotation with respect to said shell, and anchoring means for lending further reinforcement against rotation of said hook with respect to said shell and for anchoring said hook against longitudinal displacement with respect to said shell, said anchoring means including a pair of tubular eye-forming elements extending through the wall of said shell and into said plug-like closure.

3. In a fish lure, a hook having a shank, a shell surrounding said shank and having in transverse section an oblong contour, a plug-like closure confined within said shell, said closure being in union with said shank and conforming to said oblong contour whereby said hook is reinforced against rotation with respect to said shell, and anchoring means for lending further reinforcement against rotation of said hook with respect to said shell and for anchoring said hook against longitudinal displacement with respect to said shell, said anchoring means including a pair of tubular rivets, the head portions of which are disposed in a contiguous relation to the outer surface of said shell and the shank portions of which extend through the wall of said shell and into said plug-like closure.

4. In a fish lure, a hook having a shank, a shell surrounding said shank and having in transverse section an oblong contour, a plug-like closure of cementitious material confined within said shell, said closure being in adhering union with said shank and conforming to said oblong contour whereby said hook is reinforced against rotation with respect to said shell, and anchoring means for lending further reinforcement against rotation of said hook with respect to said shell and for anchoring said hook against longitudinal displacement with respect to said shell, said anchoring means including a pair of tubular rivets, the head portions of which are disposed in a contiguous relation to the outer surface of said shell and the shank portions of which extend through the wall of said shell and into said plug-like closure, said shank portions containing core-like elements of cementitious material integral with said pluglike closure and adapted to receive on their outer ends a color-lending eye-forming material.

5. In a fish lure, a hook having a shank, a shell surrounding said shank, a plug-like closure confined within said shell and maintaining an interlocking connection between said shank and said shell whereby said hook is anchored against displacement with relation to said shell, and a packing of kapok confined within said shell intermediate one end thereof and said plug-like closure.

6. In a fish lure, a hook having a shank, a shell surrounding said shank and a plug-like closure of cementitious material confined within said shell at the forward end thereof and maintaining an interlocking connection between said shank and said shell whereby said hook is anchored against displacement with relation to said shell, said cementious material being characterized by the fact that it upon drying so shrinks as to present at its forward end a concave surface.

7. In a fish lure, a hook having a shank, a shell surrounding said shank and characterized by the fact that it is a portion of the quill end of a feather, a mass of water-excluding material confined within said shell and disposed in a contiguous relation to said shank, and a color-lending material confined within said shell and visible through the wall of said shell, said color-lending material consisting of a coat of paint applied to the inner wall of said shell throughout that portion of the length thereof which is coextensive with said mass of material.

8. In a fish lure, a hook having a shank, a shell surrounding said shank and characterized by the fact that it is a portion of the quill end of a feather, a mass of water-excluding material confined within said shell and disposed in a contiguous relation to said shank, a plug-like closure confined within said shell adjacent said mass of material, a color-lending material confined within said shell and visible through the wall of said shell, said color-lending material consisting of a coat of paint applied to the inner wall of said shell throughout that portion of the length thereof which is coextensive with said mass of material, and a second color-lending material peculiar to said plug-like closure and visible through the wall of said shell throughout that portion of the length thereof which is coextensive with said plug-like closure.

9. In a fish lure, a body shell characterized by the fact that it is that portion of the quill end of a feather which tapers normally from a relatively large diameter to a relatively small diameter at its tip end and presents in elevation a substantially straight line longitudinally of itself along a given path and a curved line longitudinally of itself along a path diametrically opposed to the first-mentioned path, a hook having a shank contained within and disposed longitudinally of said shell, said shank and said shell being so related when assembled that the latter tapers rearwardly of the former.

10. In a fish lure, a body shell characterized by the fact that it possesses a substantial degree of transparency, a mass of water-excluding material confined within said shell and extending longitudinally thereof throughout a portion of the length of the shell, a plug-like closure confined within said shell adjacent said mass of material, a color-lending material confined within said shell, said color-lending material being coextensive with said mass of material and visible through the wall of said shell, a second color-lending material peculiar to said plug-like closure and visible through the wall of said shell throughout that portion of the length thereof which is coextensive with said plug-like closure.

11. In a fish lure, a hook having a shank, a shell surrounding said shank, a mass of material confined within said shell, said material being in union with said shank and with said shell whereby said hook is reinforced against rotation with respect to said shell, and one or more material-anchoring elements extending through the wall of said shell and into said material and serving to reinforce said material against displacement with respect to said shell.

12. In a fish lure, a hook having a shank, a body-forming shell associated with said shank, water-excluding means contained within said shell and including a plug-like closure disposed at one end of said shell, and one or more decorative elements extending through the wall of said shell and into said plug-like closure.

13. In a fish lure, a hook having a shank, a body-forming shell associated with said shank, water-excluding means contained within said shell and including a packing of buoyant material and a plug-like closure, said plug-like closure being located forwardly of said buoyant material, and one or more decorative elements extending through the wall of said shell and into said plug-like closure.

14. In a fish lure, a shell having in transverse section an oblong contour, a hook having a shank, said hook being disposed in the longitudinal plane of the greatest diameter of said shell with its shank extending lengthwise of said shell at a substantial distance from the longitudinal axis of said shell, said hook (including its shank) serving as a keel by which said shell when in water is maintained in an upright position so that the longitudinal plane of the greatest diameter of said shell extends vertically, and a mass of material confined within said shell, said material being in union with said shank and conforming to said oblong contour whereby said hook is reinforced against rotation with respect to said shell.

15. In a fish lure, a body shell characterized by the fact that it is that portion of the quill end of a feather which tapers normally from a relatively large diameter to a relatively small diameter at its tip end and presents in elevation a substantially straight line longitudinally of itself along a given path and a curved line longitudinally of itself along a path diametrically opposed to the first-mentioned path, and a hook having a shank contained within and disposed longitudinally of said shell.

16. In a fish lure of the type designed to simulate a live bait having a body with which are associated eyes, a body-forming shell in association with a pair of eye-simulating devices, each comprising a lug-like element having a shank portion and a head portion, said shank portion extending into the wall of said shell and said head portion being disposed in a contiguous relation to the wall of said shell, and anchoring means disposed within said shell and cooperating with said shank portion for retaining said devices in eye-simulating positions with their head portions in contiguous relation to the wall of said shell.

17. In a fish lure, a body-forming shell, a hook having a shank contained within and disposed longitudinally of said shell, a tail-forming member having a portion disposed exteriorly of said shell and another portion disposed contiguously of said shank within said shell, a binding fixed with respect to said shank and embracing said tail-forming member and said shank whereby such member is anchored to such shank, and a mass of cementitious material confined within said shell, said cementitious material being in adhering union with said fixed binding and with the inner wall of said shell whereby said hook including its shank is anchored against displacement with respect to said shell.

18. In a fish lure, a body-forming shell, a hook having a shank contained within and disposed longitudinally of said shell, a binding fixed with respect to and embracing said shank, and a mass of cementitious material confined within said shell, said cementitious material being in adhering union with said fixed binding and with the inner wall of said shell whereby said hook including its shank is anchored against displacement with respect to said shell.

WILLIAM C. MILES.